(12) United States Patent
Iriyama (10) Patent No.: US 10,401,600 B2
(45) Date of Patent: Sep. 3, 2019

(54) ZOOM LENS AND IMAGE PICKUP APPARATUS INCLUDING SAME

(71) Applicant: CANON KABUSHIKI KAISHA, Tokyo (JP)

(72) Inventor: Yutaka Iriyama, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/449,052

(22) Filed: Mar. 3, 2017

(65) Prior Publication Data

US 2017/0254992 A1    Sep. 7, 2017

(30) Foreign Application Priority Data

Mar. 7, 2016  (JP) .................................. 2016-043133

(51) Int. Cl.
*G02B 15/16* (2006.01)
*G02B 15/24* (2006.01)

(52) U.S. Cl.
CPC ............. *G02B 15/16* (2013.01); *G02B 15/24* (2013.01)

(58) Field of Classification Search
CPC ................................ G02B 15/16; G02B 15/24
USPC ............... 359/746, 760, 764, 765, 767, 768, 359/755–757
See application file for complete search history.

(56) References Cited

U.S. PATENT DOCUMENTS

| 9,402,031 | B2 | 7/2016 | Iriyama | |
| 2013/0301141 | A1* | 11/2013 | Ryu | G02B 13/02 359/683 |
| 2014/0049672 | A1* | 2/2014 | Sakamoto | G02B 15/14 348/294 |
| 2014/0268340 | A1 | 9/2014 | Ryu | |
| 2015/0301319 | A1* | 10/2015 | Komatsu | G02B 15/17 359/684 |
| 2016/0028971 | A1 | 1/2016 | Iriyama | |

(Continued)

FOREIGN PATENT DOCUMENTS

| JP | 2001356381 A | 12/2001 |
| JP | 2003-241096 A | 8/2003 |
| JP | 2011-107693 A | 6/2011 |

(Continued)

OTHER PUBLICATIONS

Notification of Reasons for Refusal issued by the Japanese Patent Office dated Mar. 5, 2019 in corresponding Japanese Patent Application No. 2016-043133, with English translation.

*Primary Examiner* — George G King
(74) *Attorney, Agent, or Firm* — Carter, DeLuca & Farrell LLP (57) ABSTRACT

In a zoom lens in which the interval between adjacent lens units changes during zooming, a magnification-varying lens group includes a lens group V having a negative refractive power and a lens unit C having a negative or positive refractive power. The lens group V includes a first magnification-varying lens group V1 including a lens unit V1a having a negative refractive power and a lens unit V1b having a negative refractive power. The lens units V1a and V1b move toward the image side such that the interval between the two lens units is largest at the telephoto end. The lens unit interval m1 on the optical axis between the lens units V1a and V1b at the wide angle end and the maximum lens unit interval m2 on the optical axis between the lens units V1a and V1b during zooming are set as appropriate.

21 Claims, 5 Drawing Sheets

(56) References Cited

U.S. PATENT DOCUMENTS

2016/0124199 A1   5/2016   Sanjo et al.

FOREIGN PATENT DOCUMENTS

| JP | 2012108244 A | 6/2012 |
| JP | 2014038237 A | 2/2014 |
| JP | 2015094864 A | 5/2015 |
| JP | 2015094867 A | 5/2015 |
| JP | 2015152798 A | 8/2015 |
| JP | 2015161693 A | 9/2015 |
| WO | 2013031203 A1 | 3/2013 |
| WO | 2014115230 A1 | 7/2014 |

* cited by examiner

ZOOM LENS AND IMAGE PICKUP APPARATUS INCLUDING SAME

BACKGROUND OF THE INVENTION

Field of the Invention

The present invention relates to a zoom lens and an image pickup apparatus including the same, and is favorable for image pickup apparatuses such as television cameras for broadcasting, home-use video cameras, digital still cameras, and analog cameras, for example.

Description of the Related Art

In recent years, a zoom lens with a large aperture ratio, a high zoom ratio, and also high optical performance has been demanded for image pickup apparatuses. A positive lead type zoom lens in which a lens group having a positive refractive power is disposed foremost on the object side has been known as a zoom lens with a large aperture ratio and a high zoom ratio.

For example, Japanese Patent Application Laid-Open No. 2003-241096 and Japanese Patent Application Laid-Open No. 2011-107693 disclose five-group zoom lenses each including a first lens group having a positive refractive power, a second lens group having a negative refractive power, a third lens group having a negative refractive power, a fourth lens group having a positive refractive power, and a fifth lens group having a positive refractive power in this order from the object side toward the image side. The disclosed zoom lens is a small zoom lens with a high zoom ratio configured such that, during zooming, the first lens group and the fifth lens group do not move while the second lens group, the third lens group, and the fourth lens group move to vary the magnification and correct an image plane variation resulting from the magnification varying.

In the case of the above positive lead type zoom lens, it is relatively easy to reduce the size of the entire system and also to increase the zoom ratio. However, the higher the zoom ratio, the greater the variations in aberrations during zooming, and therefore the more difficult it is to obtain high optical performance over the entire zoom range.

To obtain high optical performance over the entire zoom range, it is important to properly set, for example, the refractive powers of the lens groups which move during zooming and the conditions for their movements, in particular, the lens configurations of the lens group for magnification varying, the conditions for their movements during zooming, and so on. Failing to properly set these configurations increases the variations in aberrations during zooming, and thereby makes it difficult to obtain high optical performance over the entire zoom range with a high zoom ratio.

SUMMARY OF THE INVENTION

An object of the present invention is to provide a zoom lens that has a high zoom ratio, well corrects aberrations over the entire zoom range from the wide angle end to the telephoto end, and has high optical performance over the entire zoom range, and to provide an image pickup apparatus including the zoom lens.

A zoom lens of the present invention is a zoom lens including in order from an object side to an image side, a front lens group having a positive refractive power that does not move for zooming, a magnification-varying lens group including a plurality of lens units that move during zooming, and a rear lens group having a positive refractive power that does not move for zooming, an interval between the lens units adjacent each other being changed during zooming, in which the magnification-varying lens group includes a lens group V having a negative refractive power and a lens unit C having a negative or positive refractive power, the lens group V includes a first magnification-varying lens group V1 including in this order from the object side toward the image side, a lens unit V1$a$ having a negative refractive power and a lens unit V1$b$ having a negative refractive power, during zooming from a wide angle end to a telephoto end, both the lens unit V1$a$ and the lens unit V1$b$ move to the image side such that an interval between the lens unit V1$a$ and the lens unit V1$b$ is largest at the telephoto end, and a conditional expression of $$0.40 < m1/m2 < 0.98$$

is satisfied, where m1 is a lens unit interval on an optical axis between the lens unit V1$a$ and the lens unit V1$b$ at the wide angle end, and m2 is a maximum lens unit interval on the optical axis between the lens unit V1$a$ and the lens unit V1$b$ during zooming.

The present invention can provide a zoom lens that has a high zoom ratio, well corrects chromatic aberration over the entire zoom range from the wide angle end to the telephoto end, and has high optical performance over the entire zoom range, and provide an image pickup apparatus including the zoom lens.

Further features of the present invention will become apparent from the following description of exemplary embodiments with reference to the attached drawings.

DESCRIPTION OF THE EMBODIMENTS

Embodiments of the present invention will now be described in detail in accordance with the accompanying drawings. A zoom lens of the present invention includes a front lens group having a positive refractive power that does not move during zooming, a magnification-varying system including a plurality of lens units having a negative refractive power that move during zooming, and a rear lens group having a positive refractive power that does not move during zooming, which are disposed in this order from the object side toward the image side. During zooming, the interval between adjacent ones of the lens units changes. Here, the lens units refer to collections of lenses which include one or more lenses and are separated by a lens interval on the optical axis that is changed with zooming.

The magnification-varying system includes a lens group V having a negative refractive power for magnification varying, and a lens unit C having a negative or positive refractive power that corrects an image plane variation resulting from the magnification varying. The lens group V includes a first magnification-varying lens group V1 including a lens unit V1a having a negative refractive power and a lens unit V1b having a negative refractive power, which are disposed in this order from the object side toward the image side. During zooming from the wide angle end to the telephoto end, both the lens unit V1a and the lens unit V1b move toward the image side such that the interval between the two lens units is largest at the telephoto end.

Figure 1A:
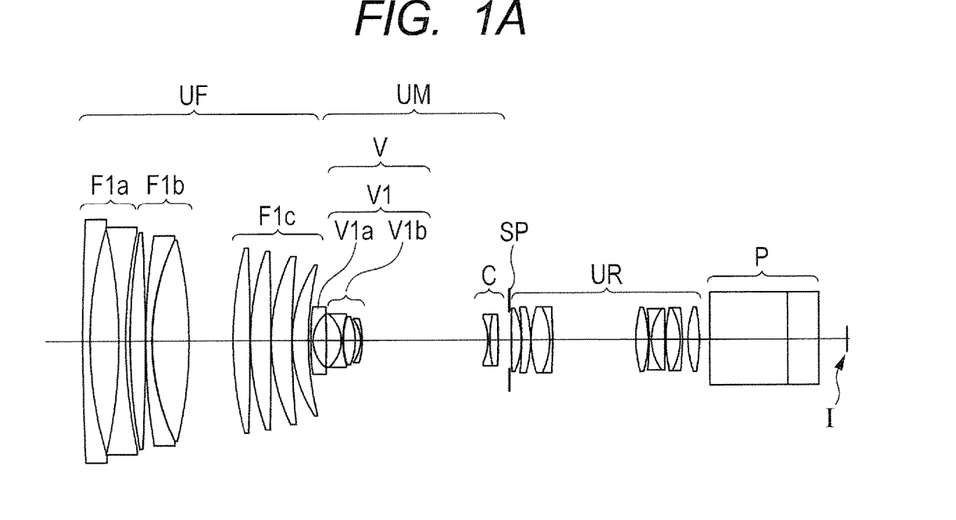
FIG. 1A is a cross-sectional view of a lens in embodiment 1 at the wide angle end.
Figure 1B:
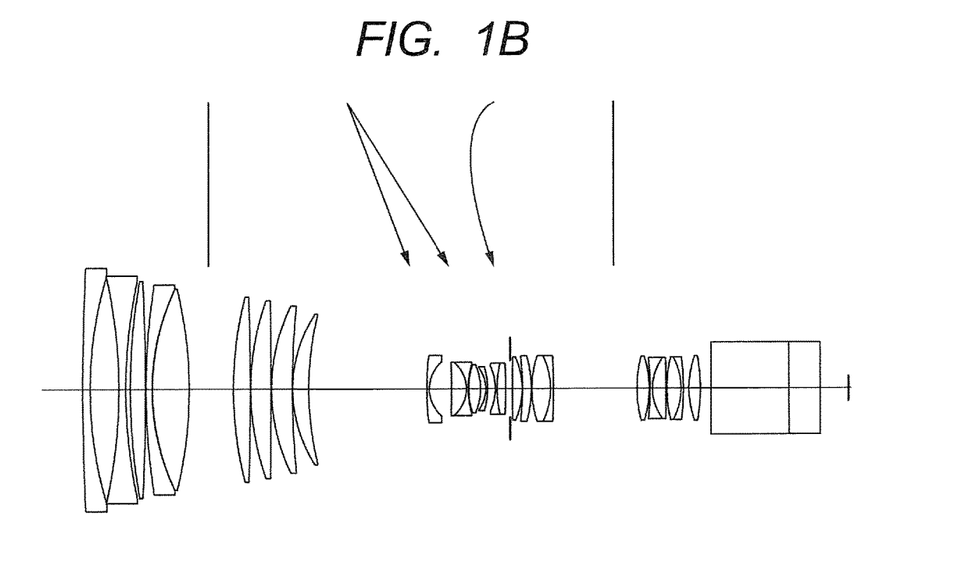
FIG. 1B is a cross-sectional view of the lens in embodiment 1 at the telephoto end.
Figure 2A:
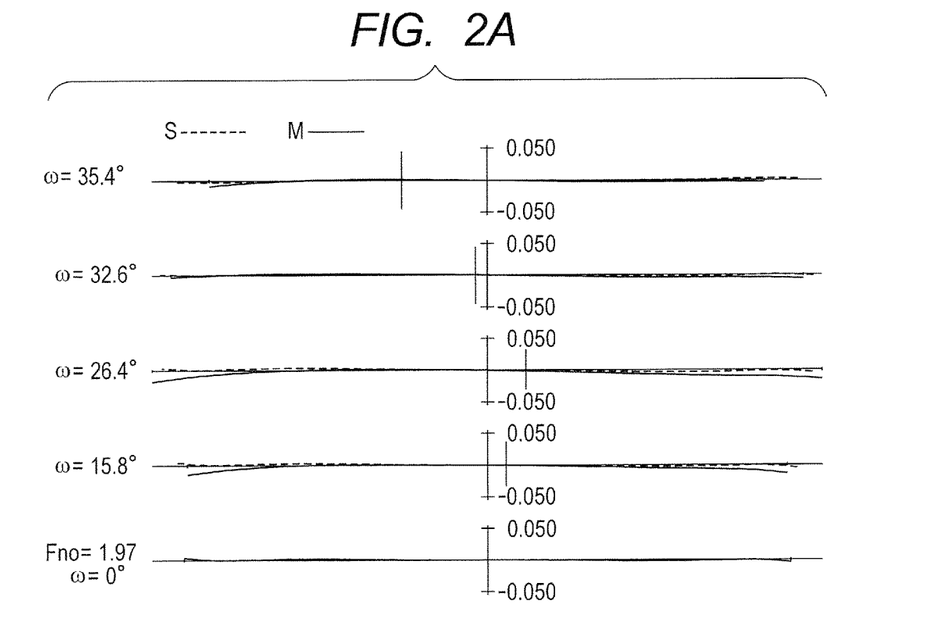
FIG. 2A is a set of diagrams of aberrations (object distance=2.5 m) at the wide angle end (f=7.75 mm) in embodiment 1.
Figure 2B:
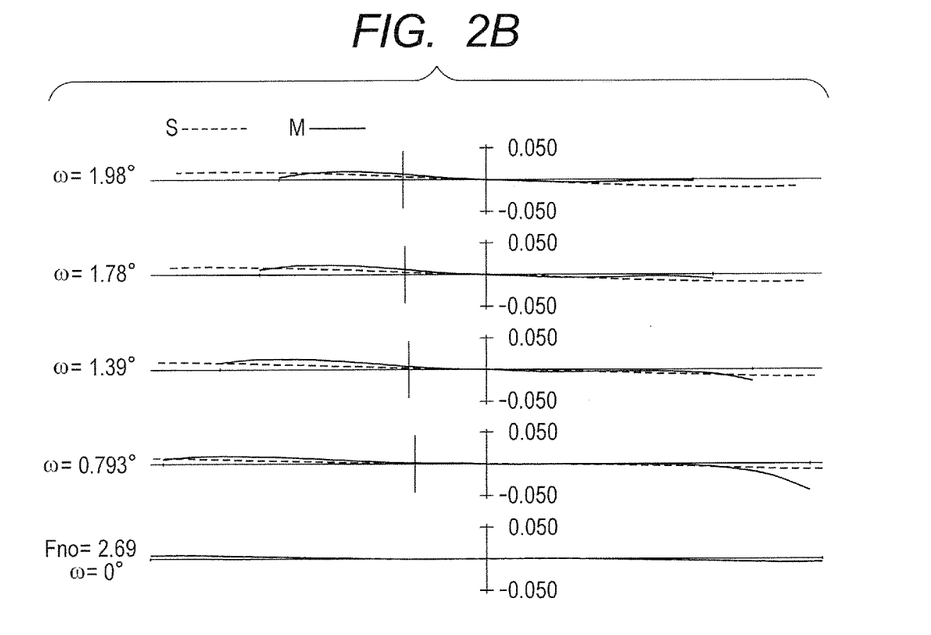
FIG. 2B is a set of diagrams of aberrations (object distance=2.5 m) at the telephoto end (f=158.92 mm) in embodiment 1.

FIGS. 1A and 1B are cross-sectional views of a lens in embodiment 1 of the present invention (infinite object distance) at the wide angle end (short focal-length end) and the telephoto end (long focal-length end), respectively. FIGS. 2A and 2B are sets of diagrams of aberrations (object distance=2.5 m) at the wide angle end and the telephoto end, respectively, in embodiment 1. Embodiment 1 represents a zoom lens with a zoom ratio of 20.51, an F-number from 1.97 to 2.69, and an angle of view from 70.72° to 3.96°. Note that the value of the object distance is a value based on a later-given numerical example described in m. The object distance is a distance from the first lens surface. The same applies below.

Figure 3A:
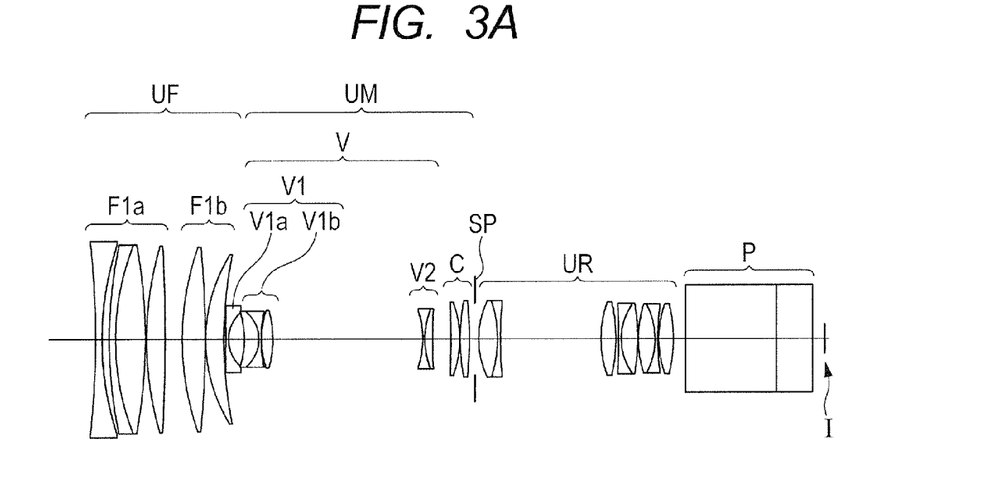
FIG. 3A is a cross-sectional view of a lens in embodiment 2 at the wide angle end.
Figure 3B:
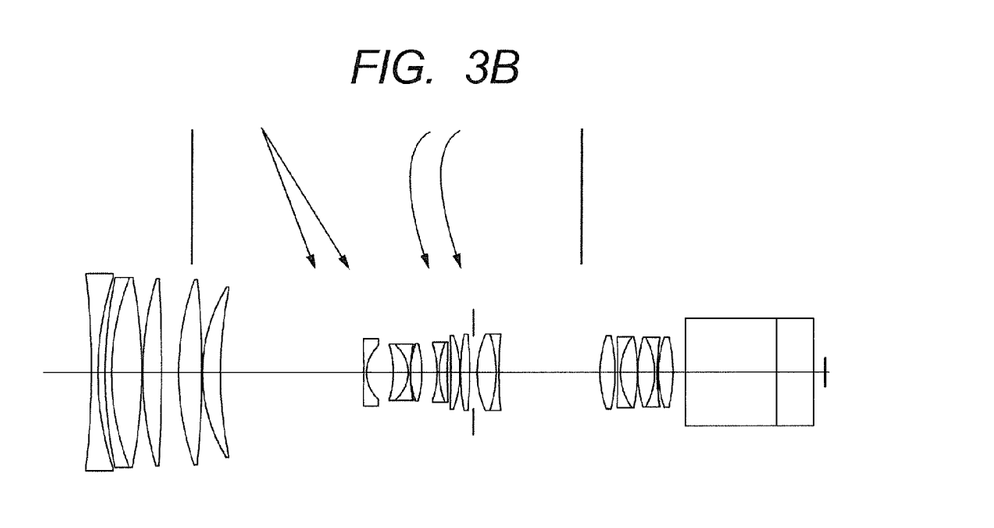
FIG. 3B is a cross-sectional view of the lens in embodiment 2 at the telephoto end.
Figure 4A:
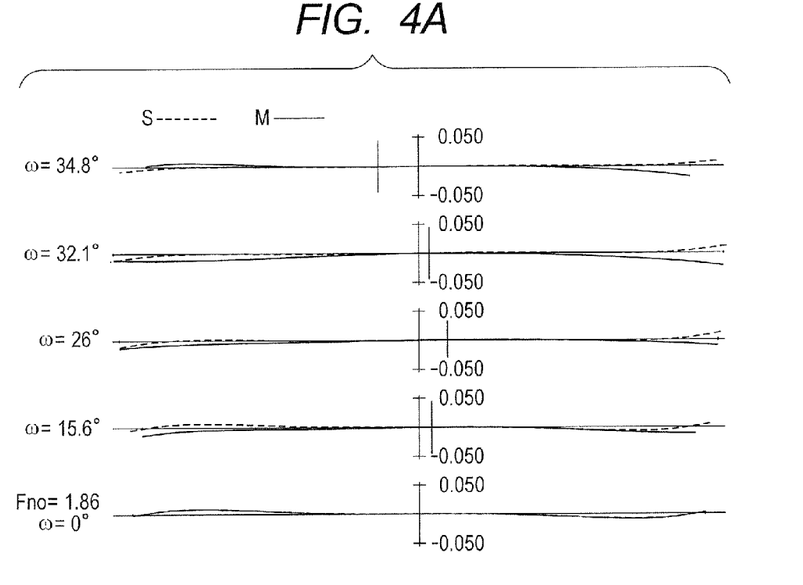
FIG. 4A is a set of diagrams of aberrations (object distance=2.5 m) at the wide angle end (f=7.90 mm) in embodiment 2.
Figure 4B:
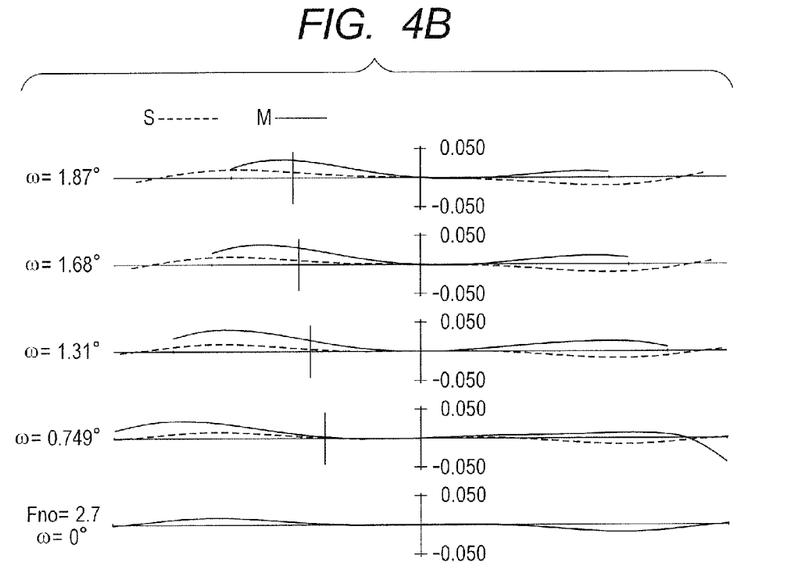
FIG. 4B is a set of diagrams of aberrations (object distance=2.5 m) at the telephoto end (f=168.33 mm) in embodiment 2.
Figure 5:
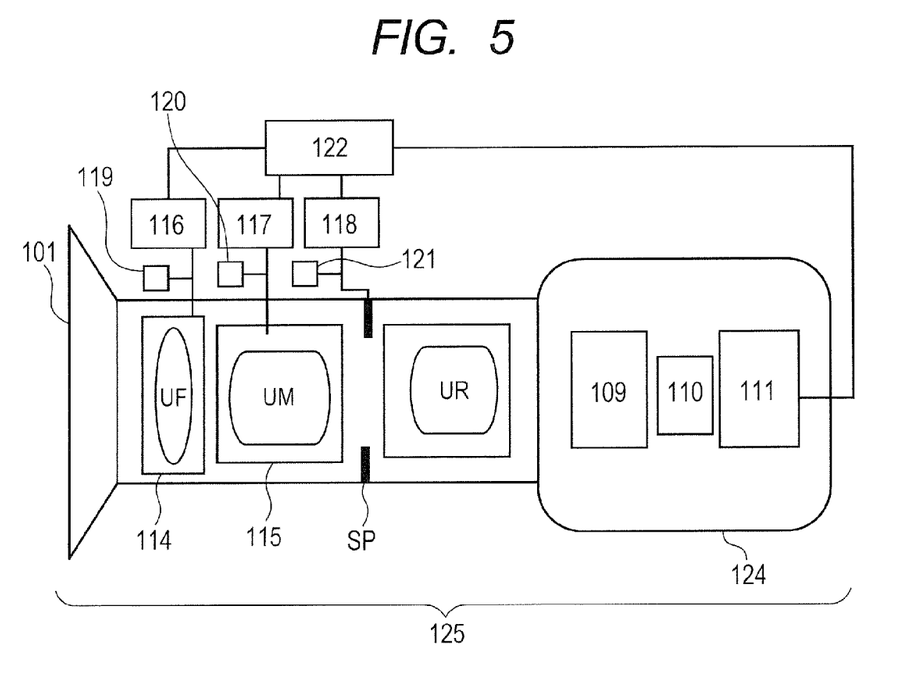
FIG. 5 is a schematic view of main parts of an image pickup apparatus of the present invention.

FIGS. 3A and 3B are cross-sectional views of a lens in embodiment 2 of the present invention (infinite object distance) at the wide angle end and the telephoto end, respectively. FIGS. 4A and 4B are sets of diagrams of aberrations (object distance=2.5 m) at the wide angle end and the telephoto end, respectively, in embodiment 2. Embodiment 2 represents a zoom lens with a zoom ratio of 21.30, an F-number from 1.86 to 2.70, and an angle of view from 69.68° to 3.74°. FIG. 5 is a schematic view of main parts of an image pickup apparatus of the present invention.

In these cross-sectional views of the lenses, reference sign UF denotes a front lens group having a positive refractive power that does not move during zooming. The front lens group UF includes a lens subunit F1a having a negative refractive power that does not move during focusing, a lens subunit F1b having a positive refractive power that moves during focusing, and in the first embodiment a lens subunit F1c having a positive refractive power that does not move during focusing, which are disposed in this order from the object side toward the image side. Reference sign UM denotes a magnification-varying system. The magnification-varying system UM includes: a lens group (variator) V including at least one lens unit having a negative refractive power for magnification varying; and a lens unit (compensator) C having a negative or positive refractive power that corrects the image plane displaced during the magnification varying.

The lens unit C moves along a locus convex to the object side during zooming from the wide angle end to the telephoto end. Reference sign SP denotes an aperture stop. Reference sign UR denotes a rear lens group having a positive refractive power that has an image forming function and does not move during zooming. Reference sign P denotes a color separation prism, an optical filter, etc. and is illustrated in the figures as a glass block. Reference sign I denotes an image pickup plane. The image pickup plane I is the image pickup plane of an image pickup element. The arrows illustrate the loci of movements of the lens units during zooming from the wide angle end to the telephoto end. In the aberration diagrams, ω represents the half angle of field (degree), Fno represents the F-number, S represents a sagittal ray of an e-line, and M represents a meridional ray of the e-line.

Next, the lens configuration of the zoom lens in each of the embodiments will be described. Embodiment 1 in FIGS. 1A and 1B and embodiment 2 in FIGS. 3A and 3B differ in the configuration of the lens group V having a negative refractive power for magnification varying. Embodiment 1 and embodiment 2 also differ in the sign of the refractive power of the lens unit C. In embodiment 1 in FIGS. 1A and 1B, the lens group V includes a first magnification-varying lens group V1. The first magnification-varying lens group V1 includes a lens unit V1a having a negative refractive power and a lens unit V1b having a negative refractive power, and moves toward the image side such that the interval between the two lens units widens during zooming from the wide angle end to the telephoto end.

The interval between the two lens units V1a and V1b enlarges during zooming from the wide angle end to the telephoto end and becomes the largest at the telephoto end. The interval during this state is changed so that coma in particular at the telephoto side can be corrected. Also, the interval between the two lens units is changed so that optical performance at the edges can be well maintained over the entire zoom range.

In embodiment 1, the lens unit V1a includes one negative lens while the lens unit V1b includes a cemented lens, a positive lens, and a negative lens disposed in this order from the object side toward the image side, the cemented lens including a positive lens and a negative lens joined to each other. In embodiment 1, the refractive power of the lens unit C is negative. The lens unit C includes a cemented lens including a negative lens and a positive lens joined to each other.

In embodiment 2 in FIGS. 3A and 3B, the lens group V includes a first magnification-varying lens group V1 having a negative refractive power for magnification varying, and a second magnification-varying lens group V2 having a negative refractive power for magnification varying. The first magnification-varying lens group V1 includes a lens unit V1a having a negative refractive power and a lens unit V1b having a negative refractive power, and moves toward the image side such that the interval between the two lens units widens during zooming from the wide angle end to the telephoto end.

The two lens units V1a and V1b are closest to each other at the wide angle end, and the interval therebetween widens as the zooming shifts toward the telephoto side. The interval in this state is changed so that coma in particular at the telephoto side can be corrected. Also, the interval between the two lens units is changed so that optical performance at the edges can be well maintained over the entire zoom range.

The second magnification-varying lens group V2 includes a lens unit having a negative refractive power, and moves along a locus convex to the object side during zooming from the wide angle end to the telephoto end. The lens unit V1a includes one negative lens. The lens unit V1b includes a cemented lens and a positive lens disposed in this order from the object side toward the image side, the cemented lens including a positive lens and a negative lens joined to each other. The second magnification-varying lens group V2 includes a cemented lens including a negative lens and a positive lens joined to each other. In embodiment 2, the refractive power of the lens unit C is positive. The lens unit C includes two positive lenses.

In each of the embodiments, the lens unit interval on the optical axis between the lens unit V1a and the lens unit V1b at the wide angle end is m1, and the maximum lens unit interval on the optical axis between the lens unit V1a and the lens unit V1b during zooming is m2. Here, the lens unit interval refers to the distance on the optical axis from the apex of the lens surface of the lens unit V1a on the image side to the apex of the lens surface of the lens unit V1b on the object side. The same applies to below. Here, a conditional expression of $$0.40 < m1/m2 < 0.98 \qquad (1)$$

is satisfied.

Next, the technical meaning of the above conditional expression will be described. Conditional expression (1) defines the amount of change in the lens unit interval on the optical axis between the lens unit V1a and the lens unit V1b. If m1/m2 exceeds the upper limit value of conditional expression (1), the zoom ratio decreases, thus making it difficult to obtain a zoom lens with a high zoom ratio. On the other hand, if m1/m2 falls below the lower limit value, it is difficult to correct coma well.

The numerical range of conditional expression (1) is more preferably set as below.

$$0.5 < m1/m2 < 0.7 \qquad (1a)$$

In numerical data 1 to be presented later, m1=5.5 and m2=9.6, and the value of conditional expression (1) is therefore 0.57. In numerical data 2, m1=5.7 and m2=9.7, and the value of conditional expression (1) is therefore 0.59.

Preferably, in each of the embodiments, the focal length of the entire system at the wide angle end is Fw, and the focal length of the entire system at the telephoto end is Ft. Here, a conditional expression of $$6.0 < Ft/Fw < 40.0 \qquad (2)$$

is preferably satisfied. Conditional expression (2) defines the zoom ratio of the zoom lens. If Ft/Fw exceeds the upper limit of conditional expression (2), it is difficult to correct coma, which will lead to deterioration in optical performance at the edges of an image. On the other hand, if Ft/Fw falls below the lower limit value, the zoom ratio decreases and also coma is excessively corrected at the telephoto side, which are not desirable.

The numerical range of conditional expression (2) is more preferably set as below.

$$15.0 < Ft/Fw < 25.0 \qquad (2a)$$

In numerical data 1 to be presented later, Fw=7.75 and Ft=158.92, and the value of conditional expression (2) is therefore 20.51. In numerical data 2 to be presented later, Fw=7.90 and Ft=168.33, and the value of conditional expression (2) is therefore 21.31.

The front lens group UF includes the lens subunit F1a having a negative refractive power that does not move during focusing, the lens subunit F1b having a positive refractive power that moves during focusing, and the lens subunit F1c having a positive refractive power that does not move during focusing, which are disposed in this order from the object side toward the image side. The lens subunit F1c preferably includes a plurality of positive lenses.

In the zoom lens of the present invention, the lens unit V1a well corrects coma at the edges of an image. Thus, it is preferable to form the lens subunit F1c only with positive lenses and correct coma and other aberrations in a balanced manner.

FIG. 5 is a schematic view of main parts of an image pickup apparatus 125 (television camera system) using the zoom lens of each of the embodiments as an image pickup optical system. In FIG. 5, reference sign 101 denotes the zoom lens of either embodiment 1 or embodiment 2. Reference sign 124 denotes a camera body, and the zoom lens 101 is attachable to and detachable from the camera body 124. Reference sign 125 denotes an image pickup apparatus (image pickup system) formed by mounting the zoom lens 101 to the camera body 124. Meanwhile, the zoom lens 101 and the camera body 124 may be formed integrally with each other.

The zoom lens 101 includes the front lens group UF, a magnification-varying system UM, and the rear lens group UR. The front lens group UF includes lens units for focusing. The magnification-varying system UM includes a lens unit that moves on the optical axis for magnification varying and a lens unit that moves on the optical axis for correcting an image plane variation resulting from the magnification varying. Reference sign SP denotes an aperture stop.

Reference signs 114 and 115 denote drive mechanisms such as a helicoid or a cam that drive the front lens group UF and the magnification-varying system UM in the optical axis direction, respectively. Reference signs 116 to 118 denote motors (drive units) that electrically drive the drive mechanisms 114 and 115 and the aperture stop SP, respectively. Reference signs 119 to 121 denote detectors such as an encoder, a potentiometer, or a photosensor that detect the positions of the front lens group UF and the magnification-varying system UM on the optical axis and the aperture diameter of the aperture stop SP, respectively.

Regarding the camera body 124, reference sign 109 denotes a glass block which is an optical filter or a color separation prism inside the camera body 124, and reference sign 110 denotes a solid-state image pickup element (photoelectric conversion element) such as a CCD sensor or a CMOS sensor that receives a subject's image formed by the zoom lens 101. Moreover, reference signs 111 and 122 are CPUs that control the drive of given parts of the camera body 124 and the zoom lens 101. By using the zoom lens of the present invention in a television camera as above, an image pickup apparatus having high optical performance can be obtained.

Numerical data 1 and numerical data 2 corresponding respectively to embodiment 1 and embodiment 2 of the present invention are shown below. In the numerical data, reference sign i denotes the sequential position of a surface from the object side, reference sign ri denotes the radius of curvature of the i-th surface from the object side, reference sign di denotes the interval between the i-th surface and the i+1-th surface from the object side, and reference signs ndi and vdi denote the refractive index and Abbe number of the optical member between the i-th surface and the i+1-th surface. The last three surfaces are the glass block, such as a filter. Reference sign BF denotes the back focus. The back focus BF indicates values in air from the final lens surface to the image plane. The entire lens length is a value obtained by adding the back focus in air to the distance from the first lens surface to the final lens surface.

The shape of each aspheric surface is expressed by the following equation, where an X axis is in the optical axis direction, an H axis is in a direction perpendicular to the optical axis, the direction in which light advances is a positive direction, R is the paraxial curvature radius, k is the conic constant, and A3, A4, A5, A6, A7, A8, A9, A10, A11, and A12 are aspherical coefficients.

$$X = \frac{H^2/R}{1+\sqrt{1-(1+k)(H/R)^2}} + A4 \cdot H^4 + A6 \cdot H^6 + A8 \cdot H^8 + A10 \cdot H^{10} + A12 \cdot H^{12} + A3 \cdot H^3 + A5 \cdot H^5 + A7 \cdot H^7 + A9 \cdot H^9 + A11 \cdot H^{11}$$

Also, "e-z" means "×10$^{-z}$". An asterisk indicates an aspheric surface. The correspondences between the numerical data and the above-mentioned conditional expressions and the parameters therein are shown in table 1.

[Numerical Data 1]
[unit: mm]

Surface Data

| surface no. i | ri | di | ndi | vdi |
|---|---|---|---|---|
| 1 | 1152.736 | 3.12 | 1.77250 | 49.6 |
| 2 | 192.605 | 12.20 | | |
| 3 | −246.653 | 2.90 | 1.64000 | 60.1 |
| 4 | 253.577 | 1.84 | | |
| 5 | 303.963 | 6.46 | 1.61800 | 63.3 |
| 6 | −1045.903 | 0.15 | | |
| 7 | 321.283 | 2.60 | 1.80518 | 25.4 |
| 8 | 111.113 | 0.16 | | |
| 9 | 112.568 | 15.62 | 1.43387 | 95.1 |
| 10 | −204.208 | 18.85 | | |
| 11 | 180.807 | 7.20 | 1.59240 | 68.3 |
| 12 | −1235.290 | 0.15 | | |
| 13 | 128.104 | 8.61 | 1.43387 | 95.1 |
| 14 | −2177.868 | 0.15 | | |
| 15 | 90.778 | 8.80 | 1.43387 | 95.1 |
| 16 | 407.678 | 0.15 | | |
| 17 | 65.696 | 6.77 | 1.59240 | 68.3 |
| 18 | 148.128 | (variable) | | |
| 19* | 197.626 | 1.00 | 1.88300 | 40.8 |
| 20 | 16.351 | (variable) | | |
| 21 | −483.188 | 6.33 | 1.80809 | 22.8 |
| 22 | −16.325 | 0.75 | 1.81600 | 46.6 |
| 23 | 41.729 | 0.15 | | |
| 24* | 43.678 | 5.10 | 1.56732 | 42.8 |
| 25 | −28.227 | 2.19 | | |
| 26 | −17.307 | 0.75 | 1.88300 | 40.8 |
| 27 | −38.182 | (variable) | | |
| 28 | −25.618 | 0.75 | 1.81600 | 46.6 |
| 29 | 56.076 | 3.55 | 1.92286 | 21.3 |
| 30 | −273.516 | (variable) | | |
| 31 (stop) | ∞ | 0.84 | | |
| 32 | 567.106 | 4.26 | 1.67003 | 47.2 |
| 33 | −36.836 | 0.14 | | |
| 34 | −128.999 | 3.77 | 1.51823 | 58.9 |
| 35 | −55.204 | 0.16 | | |
| 36 | 48.439 | 8.02 | 1.48749 | 70.2 |
| 37 | −35.593 | 1.15 | 1.88300 | 40.8 |
| 38 | −270.114 | 35.30 | | |
| 39 | 58.257 | 5.27 | 1.48749 | 70.2 |
| 40 | −49.331 | 0.36 | | |
| 41 | −135.051 | 1.00 | 1.88300 | 40.8 |
| 42 | 24.333 | 5.81 | 1.58913 | 61.1 |
| 43 | −1544.478 | 0.50 | | |
| 44 | 65.713 | 6.06 | 1.50127 | 56.5 |
| 45 | −31.235 | 1.00 | 1.88300 | 40.8 |
| 46 | −123.778 | 2.28 | | |
| 47 | 46.635 | 4.83 | 1.51633 | 64.1 |
| 48 | −80.164 | 4.50 | | |
| 49 | ∞ | 33.00 | 1.60859 | 46.4 |
| 50 | ∞ | 13.20 | 1.51633 | 64.2 |
| 51 | ∞ | 12.12 | | |
| image plane | ∞ | | | |

Aspheric Surface Data

19th surface

K = −4.02600e+002
A4 = 1.92602e−005
A6 = 2.75811e−008
A8 = −2.58446e−010
A10 = 1.42778e−012
A12 = −3.17834e−015
A3 = −2.24483e−005
A5 = −1.22124e−006
A7 = 5.18689e−009
A9 = −2.47951e−011
A11 = 5.26893e−014

24th surface

K = 2.95550e+000
A4 = 9.62550e−006
A6 = −7.35957e−008
A8 = −5.17167e−010
A10 = −1.58150e−012
A12 = 6.22703e−014
A3 = 3.42571e−005
A5 = 1.56729e−006
A7 = 2.67159e−010
A9 = 1.27909e−010
A11 = −9.90718e−013

Various Data
Zoom Ratio 20.51

| Focal Length | 7.75 | 13.77 | 46.92 | 116.35 | 158.92 |
|---|---|---|---|---|---|
| F-NUMBER | 1.97 | 1.96 | 1.96 | 1.97 | 2.69 |
| Half Angle of View (Degs.) | 35.36 | 21.77 | 6.69 | 2.71 | 1.98 |
| Image Height | 5.50 | 5.50 | 5.50 | 5.50 | 5.50 |
| Lens Total Length | 307.88 | 307.88 | 307.88 | 307.88 | 307.88 |
| BF | 45.79 | 45.79 | 45.79 | 45.79 | 45.79 |
| d18 | 1.06 | 18.37 | 40.29 | 48.43 | 50.08 |
| d20 | 5.54 | 6.59 | 8.37 | 9.38 | 9.63 |
| d27 | 53.58 | 32.97 | 6.35 | 1.56 | 3.33 |
| d30 | 4.85 | 7.11 | 10.02 | 5.66 | 2.00 |

Zoom lens unit Data

| Unit | Start Surface | Focal Length |
|---|---|---|
| 1 | 1 | 63.66 |
| 2 | 19 | −20.12 |
| 3 | 21 | −64.40 |
| 4 | 28 | −37.98 |
| 5 | 31 | 61.17 |

[Numerical Data 2]
[unit: mm]

Surface Data

| surface no. i | ri | di | ndi | vdi |
|---|---|---|---|---|
| 1 | −357.723 | 2.30 | 1.72047 | 34.7 |
| 2 | 124.535 | 2.63 | | |
| 3 | 188.541 | 2.30 | 1.75520 | 27.5 |
| 4 | 105.799 | 10.87 | 1.43875 | 94.9 |
| 5 | −206.903 | 0.40 | | |

-continued

[Numerical Data 2]
[unit: mm]

| | | | | |
|---|---|---|---|---|
| 6 | 136.932 | 6.75 | 1.43387 | 95.1 |
| 7 | −719.540 | 6.21 | | |
| 8 | 115.039 | 8.39 | 1.59240 | 68.3 |
| 9 | −383.737 | 0.15 | | |
| 10 | 65.620 | 6.55 | 1.75500 | 52.3 |
| 11 | 172.249 | (variable) | | |
| 12* | −204.554 | 1.00 | 1.88300 | 40.8 |
| 13 | 14.499 | (variable) | | |
| 14 | −36.637 | 5.36 | 1.80809 | 22.8 |
| 15 | −14.294 | 0.75 | 1.88300 | 40.8 |
| 16 | 53.880 | 0.18 | | |
| 17 | 37.303 | 4.08 | 1.66680 | 33.0 |
| 18 | −43.609 | (variable) | | |
| 19 | −34.572 | 0.75 | 1.74320 | 49.3 |
| 20 | 33.356 | 2.82 | 1.84649 | 23.9 |
| 21 | 225.957 | (variable) | | |
| 22 | −590.037 | 3.24 | 1.65844 | 50.9 |
| 23 | −42.334 | 0.15 | | |
| 24 | 86.590 | 3.33 | 1.51823 | 58.9 |
| 25 | −152.475 | (variable) | | |
| 26 (stop) | ∞ | 1.30 | | |
| 27 | 35.956 | 6.93 | 1.49700 | 81.5 |
| 28 | −49.256 | 1.00 | 1.88300 | 40.8 |
| 29 | 159.092 | 36.60 | | |
| 30 | 43.911 | 5.49 | 1.48749 | 70.2 |
| 31 | −64.723 | 0.91 | | |
| 32 | −395.258 | 1.00 | 1.83489 | 42.6 |
| 33 | 24.075 | 6.10 | 1.48749 | 70.2 |
| 34 | −75.619 | 0.15 | | |
| 35 | 46.271 | 6.12 | 1.51633 | 64.1 |
| 36 | −29.306 | 1.00 | 1.88300 | 40.8 |
| 37 | 110.271 | 0.34 | | |
| 38 | 42.112 | 5.30 | 1.57501 | 41.5 |
| 39 | −61.592 | 4.50 | | |
| 40 | ∞ | 33.00 | 1.60859 | 46.4 |
| 41 | ∞ | 13.20 | 1.51633 | 64.1 |
| 42 | ∞ | 4.38 | | |
| image plane | ∞ | | | |

Aspheric Surface Data

12th surface $K = 2.30990e+002$
$A4 = 2.95863e-005$
$A6 = -4.64618e-008$
$A8 = -1.05729e-009$
$A10 = -5.09400e-011$
$A12 = 2.06461e-014$
$A3 = -1.91280e-005$
$A5 = -1.16899e-006$
$A7 = 3.34282e-009$
$A9 = 4.94284e-010$
$A11 = 1.32165e-012$ Various Data
Zoom Ratio 21.30

| | | | | | |
|---|---|---|---|---|---|
| Focal Length | 7.90 | 16.92 | 33.54 | 115.33 | 168.33 |
| F-NUMBER | 1.86 | 1.86 | 1.87 | 1.87 | 2.70 |
| Half Angle of View (Degs.) | 34.84 | 18.01 | 9.31 | 2.73 | 1.87 |
| Image Height | 5.50 | 5.50 | 5.50 | 5.50 | 5.50 |
| Lens Total Length | 248.19 | 248.19 | 248.19 | 248.19 | 248.19 |
| BF | 38.05 | 38.05 | 38.05 | 38.05 | 38.05 |
| d11 | 0.72 | 21.59 | 36.20 | 49.82 | 51.71 |
| d13 | 5.72 | 8.39 | 7.81 | 9.10 | 9.70 |
| d18 | 54.54 | 17.79 | 7.45 | 3.03 | 5.51 |
| d21 | 6.66 | 11.67 | 12.92 | 6.54 | 1.45 |
| d25 | 2.05 | 10.24 | 5.32 | 1.21 | 1.33 |

[Numerical Data 2]
[unit: mm]

Zoom lens unit Data

| Unit | Start Surface | Focal Length |
|---|---|---|
| 1 | 1 | 67.93 |
| 2 | 12 | −15.21 |
| 3 | 14 | −122.40 |
| 4 | 19 | −44.93 |
| 5 | 22 | 42.00 |
| 6 | 26 | 51.78 |

TABLE 1

| | m1 | m2 | Fw | Ft | Conditional Expression (1) | Conditional Expression (2) |
|---|---|---|---|---|---|---|
| Embodiment 1 | 5.54 | 9.63 | 7.75 | 158.92 | 0.575 | 20.5 |
| Embodiment 2 | 5.72 | 9.70 | 7.90 | 168.33 | 0.590 | 21.3 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-043133, filed Mar. 7, 2016, which is hereby incorporated by reference herein in its entirety.

What is claimed is:

1. A zoom lens comprising in order from an object side to an image side a front lens group having a positive refractive power and configured not to move for zooming, a second lens group including a plurality of lens units each configured to move for zooming, and a rear lens group having a positive refractive power and configured not to move for zooming, an interval between each two, of a lens group, a lens unit, a lens subunit, and a lens sub-subunit, adjacent to each other being changed for zooming,
wherein at least a part of the front lens group is configured to move for focusing,
the second lens group includes a lens unit V having a negative refractive power and a lens unit C,
the lens unit V includes a lens subunit V1 including in order from the object side to the image side a lens sub-subunit V1a having a negative refractive power and a lens sub-subunit V1b having a negative refractive power,
a conditional expression $$0.50 < m1/m2 < 0.98$$

is satisfied, where m1 is an interval on an optical axis between the lens sub-subunit V1a and the lens sub-subunit V1b at a wide angle end, and m2 is a maximum interval on the optical axis between the lens sub-subunit V1a and the lens sub-subunit V1b for zooming, and
wherein the lens unit V includes a lens subunit V2 on the image side of the lens subunit V1, the lens subunit V2 having a negative refractive power and configured to move along a locus convex toward the object side for zooming from the wide angle end to a telephoto end.

2. The zoom lens according to claim 1, wherein a conditional expression $$6.0 < Ft/Fw < 40.0$$

is satisfied, where Fw is a focal length of the zoom lens at the wide angle end, and Ft is a focal length of the zoom lens at the telephoto end.

3. The zoom lens according to claim 1, wherein
the front lens group includes in order from the object side to the image side a lens unit F1a having a negative refractive power and configured not to move for focusing, a lens unit F1b having a positive refractive power and configured to move for focusing, and a lens unit F1c having a positive refractive power and configured not to move for focusing, and
the lens unit F1c includes a plurality of positive lenses.

4. The zoom lens according to claim 1, wherein the lens unit C is configured to move along a locus convex toward the object side for zooming from the wide angle end to the telephoto end.

5. The zoom lens according to claim 1, wherein the lens sub-subunit V1a includes a negative lens.

6. The zoom lens according to claim 1, wherein the lens sub-subunit V1b includes in order from the object side to the image side a cemented lens, a positive lens, and a negative lens, the cemented lens including in order from the object side to the image side a positive lens and a negative lens.

7. The zoom lens according to claim 1, wherein the lens sub-subunit V1b includes in order from the object side to the image side a cemented lens and a positive lens, the cemented lens including in order from the object side to the image side a positive lens and a negative lens.

8. The zoom lens according to claim 1, wherein the lens subunit V2 includes a cemented lens including a negative lens and a positive lens.

9. The zoom lens according to claim 1, wherein the maximum interval m2 is at the telephoto end.

10. An image pickup apparatus comprising:
a zoom lens; and
an image pickup element configured to receive an image formed by the zoom lens,
wherein the zoom lens comprises in order from an object side to an image side a front lens group having a positive refractive power and configured not to move for zooming, a second lens group including a plurality of lens units each configured to move for zooming, and a rear lens group having a positive refractive power adjacent to each other being changed for zooming,
at least a part of the front lens group is configured to move for focusing,
the second lens group includes a lens group V having a negative refractive power and a lens unit C,
the lens group V includes a lens group V1 including in order from the object side to the image side a lens unit V1a having a negative refractive power and a lens unit V1b having a negative refractive power,
a conditional expression $$0.50 < m1/m2 < 0.98$$

is satisfied, where m1 is an interval on an optical axis between the lens unit V1a and the lens unit V1b at a wide angle end, and m2 is a maximum interval on the optical axis between the lens unit V1a and the lens unit V1b for zooming, and
wherein the lens unit V includes a lens group V2 on the image side of the lens group V1, the lens unit V2 having a negative refractive power and configured to move along a locus convex toward the object side for zooming from the wide angle end to a telephoto end.

11. The image pickup apparatus according to claim 10, wherein the maximum interval m2 is at the telephoto end.

12. A zoom lens comprising in order from an object side to an image side a front lens group having a positive refractive power and configured not to move for zooming, a second lens group including a plurality of lens units each configured to move for zooming, and a rear lens group having a positive refractive power and configured not to move for zooming, an interval between each two, of a lens group, a lens unit, a lens subunit, and a lens sub-subunit, adjacent to each other being changed for zooming,
wherein at least a part of the front lens group is configured to move for focusing,
the second lens group includes a lens unit V having a negative refractive power and a lens unit C,
the lens unit V includes a lens subunit V1 including in order from the object side to the image side a lens sub-subunit V1a having a negative refractive power and a lens sub-subunit V1b having a negative refractive power,
a conditional expression $$0.50 < m1/m2 < 0.98$$

is satisfied, where m1 is an interval on an optical axis between the lens sub-subunit V1a and the lens sub-subunit V1b at a wide angle end, and m2 is a maximum interval on the optical axis between the lens sub-subunit V1a and the lens sub-subunit V1b for zooming, and
wherein the lens sub-subunit V1b includes in order from the object side to the image side a cemented lens and a positive lens, the cemented lens including in order from the object side to the image side a positive lens and a negative lens.

13. The zoom lens according to claim 12, wherein a conditional expression $$5.0 < Ft/Fw < 40.0$$

is satisfied, where Fw is a focal length of the zoom lens at the wide angle end, and Ft is a focal length of the zoom lens at a telephoto end.

14. The zoom lens according to claim 12, wherein
the front lens group includes in order from the object side to the image side a lens unit F1a having a negative refractive power and configured not to move for focusing, a lens unit F1b having a positive refractive power and configured to move for focusing, and a lens unit F1c having a positive refractive power and configured not to move for focusing, and
the lens unit F1c includes a plurality of positive lenses.

15. The zoom lens according to claim 12, wherein
the lens unit V includes a lens subunit V2 on the image side of the lens subunit V1, the lens subunit V2 having a negative refractive power and configured to move along a locus convex toward the object side for zooming from the wide angle end to a telephoto end.

16. The zoom lens according to claim 12, wherein the lens unit C is configured to move along a locus convex toward the object side for zooming from the wide angle end to a telephoto end.

17. The zoom lens according to claim 12, wherein the lens sub-subunit V1a includes a negative lens.

18. The zoom lens according to claim 12, wherein the lens sub-subunit V1b including in order from the object side to the image side the cemented lens and the positive lens, further includes a negative lens on the image side of the positive lens.

19. The zoom lens according to claim 15, wherein the lens subunit V2 includes a cemented lens including a negative lens and a positive lens.

20. The zoom lens according to claim 12, wherein the maximum interval m2 is at a telephoto end.

21. An image pickup apparatus comprising:
a zoom lens; and
an image pickup element configured to receive an image formed by the zoom lens,
wherein the zoom lens comprises in order from an object side to an image side a front lens group having a positive refractive power and configured not to move for zooming, a second lens group including a plurality of lens units each configured to move for zooming, and a rear lens group having a positive refractive power adjacent to each other being changed for zooming,
at least a part of the front lens group is configured to move for focusing,
the second lens group includes a lens group V having a negative refractive power and a lens unit C,
the lens group V includes a lens group V1 including in order from the object side to the image side a lens unit V1$a$ having a negative refractive power and a lens unit V1$b$ having a negative refractive power,
a conditional expression $$0.50 < m1/m2 < 0.98$$

is satisfied, where m1 is an interval on an optical axis between the lens unit V1$a$ and the lens unit V1$b$ at a wide angle end, and m2 is a maximum interval on the optical axis between the lens unit V1$a$ and the lens unit V1$b$ for zooming, and
wherein the lens unit V1$b$ includes in order from the object side to the image side a cemented lens and a positive lens, the cemented lens including in order from the object side to the image side a positive lens and a negative lens.

* * * * *